(12) United States Patent
Goodman et al.

(10) Patent No.: US 8,793,451 B2
(45) Date of Patent: Jul. 29, 2014

(54) SNAPSHOT CONTENT METADATA FOR APPLICATION CONSISTENT BACKUPS

(75) Inventors: Daniel Isaac Goodman, Beit Shemesh (IL); Yakov Jacob Broido, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/434,422

(22) Filed: Mar. 29, 2012

(65) Prior Publication Data

US 2013/0262800 A1 Oct. 3, 2013

(51) Int. Cl.
*G06F 12/00* (2006.01)
(52) U.S. Cl.
USPC .......................................................... 711/162
(58) Field of Classification Search
None
See application file for complete search history.

(56) References Cited

U.S. PATENT DOCUMENTS

| | | | |
|---|---|---|---|
| 7,707,184 B1 | 4/2010 | Zhang et al. | |
| 7,827,150 B1 | 11/2010 | Wu et al. | |
| 8,380,954 B1 | 2/2013 | Patil et al. | |
| 2006/0129763 A1* | 6/2006 | Royer et al. | 711/118 |
| 2009/0271581 A1 | 10/2009 | Hinrichs, Jr. | |
| 2011/0258381 A1* | 10/2011 | Rossi et al. | 711/114 |

* cited by examiner

*Primary Examiner* — Brian Peugh
(74) *Attorney, Agent, or Firm* — Griffiths & Seaton PLLC

(57) ABSTRACT

At least one of configuration information of a storage volume stored on a storage system and characteristics of a snapshot, including characteristics of one or more files stored in the snapshot, are identified. Snapshot content metadata, comprising the at least one of the identified characteristics and the configuration information, is created. The snapshot content metadata is associated with the snapshot.

14 Claims, 3 Drawing Sheets

SNAPSHOT CONTENT METADATA FOR APPLICATION CONSISTENT BACKUPS

FIELD OF THE INVENTION

The present invention relates generally to data storage, and specifically to defining snapshot content metadata for application consistent backups.

BACKGROUND

"Quiescing" is a term used to describe pausing or altering a state of processes executing on a computer, particularly processes that might modify information stored on a storage device during a backup, thereby guaranteeing a consistent and usable backup. Quiescing typically requires flushing any outstanding writes to the storage device.

In computer storage systems, application consistent snapshots comprise snapshots taken while an application is quiesced. Application consistent snapshots typically require special handling during both snapshot creation and snapshot restoration in order to maintain consistency. Part of this operation is to ensure that all application data is quiesced in the storage medium before the backup/snapshot occurs.

A snapshot comprises a copy of data residing on a storage volume (e.g., a disk drive) that is created at a particular point in time. Since a full backup of a large data set can take a long time to complete, a snapshot may define the dataset to be backed up. Data associated with the snapshot is static, and is therefore protected from any subsequent changes to the data on the volume (e.g., a database update).

One typical implementation of a snapshot is called a "pointer snapshot." A pointer snapshot records an index of data locations to be protected on the volume. Pointer snapshots can be created fairly quickly and require far less storage space than is required to maintain a separate copy of the snapshot data.

SUMMARY

Method, system, and computer program product embodiments for processing a snapshot in a computing environment by a processor are disclosed. In one embodiment, by way of example only, at least one of configuration information of a storage volume stored on a storage system and characteristics of the snapshot, including characteristics of one or more files stored in the snapshot, are identified. Snapshot content metadata, including the identified characteristics and the configuration information, is created. The snapshot content metadata is associated with the snapshot.

Other embodiments are disclosed and provide related advantages.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
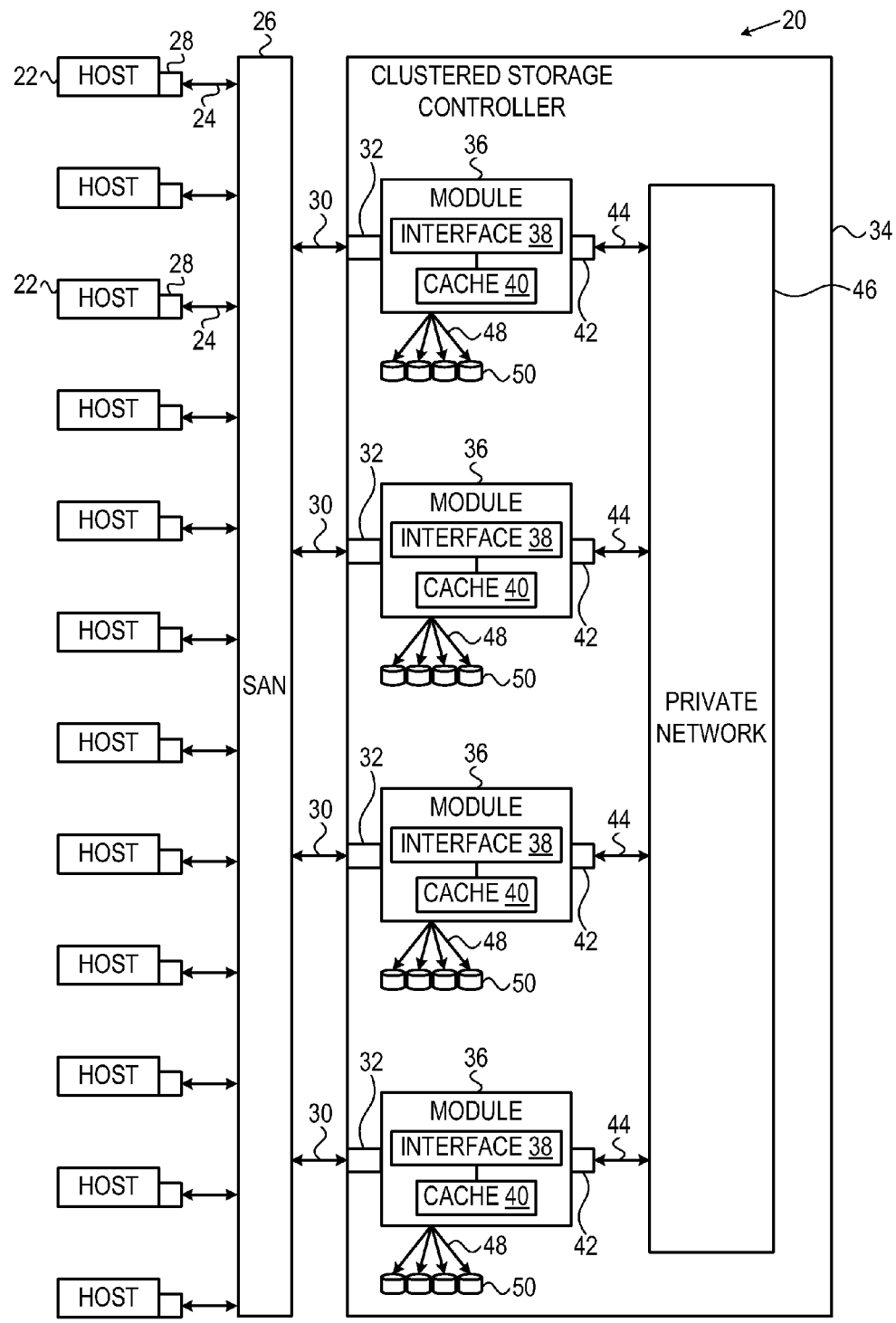
FIG. 1 is a schematic pictorial illustration of a storage system, in accordance with an embodiment of the present invention.

As described supra, a snapshot comprises a copy of data residing on a logical storage volume that is created at a particular point in time. When defining a snapshot, a storage system typically creates and stores snapshot definition data comprising information such as pointers to physical storage blocks (also referred to herein as blocks) of the logical volume (i.e., blocks to include in the snapshot), and a date and a time that the snapshot was created.

Embodiments of the present invention provide methods and systems for creating snapshot content metadata that includes characteristics of one or more files stored in a given snapshot. In some embodiments, the snapshot content metadata may also comprise a configuration (i.e., hardware and/or software) of the storage system at the time the given snapshot was created.

For example, files stored in a snapshot may include spreadsheet and word processing files. As described in detail hereinbelow, when creating the given snapshot, snapshot content metadata can be created comprising a directory listing of the word processing and spreadsheet files, and the storage system configuration. In some embodiments, the directory listing can be included in a backup catalog. The created snapshot content metadata can then be associated with the snapshot, and stored to either a volatile memory or a storage volume of the storage system. Since the snapshot content metadata is associated with the snapshot, any operations subsequently performed on the snapshot can be applied to the snapshot content metadata as well. For example, if the snapshot is moved to a new storage subsystem, the snapshot content metadata can be copied to the new storage subsystem as well.

At a later time, the snapshot content metadata can be accessed prior to deciding whether or not to restore the snapshot (e.g., to identify files in the snapshot). Additionally, by storing the system configuration at the time of the snapshot to the snapshot content metadata, embodiments of the present invention can help ensure that the proper environment exists prior to restoring the snapshot.

There are instances where an application stores files on multiple storage volumes. For example, a database server may store database tables on a first given storage volume, database indexes on a second given storage volume, and database schemas on a third given volume. Alternatively, a logical volume manager (LVM) may create a single storage volume that comprises multiple physical disk drives. Therefore the first given storage volume, the multiple storage volumes are logically joined in the sense that any changes to any one of the related storage volumes typically results in corresponding changes to the other related storage volumes.

Logically joined storage volumes may be referred to as "consistency groups", and storage systems supporting consistency groups may perform a snapshot operation on the consistency group rather than each of the storage volumes individually, thereby ensuring that the snapshot operation is performed on all the volumes at the same time (and all input/output operations are quiesced from the storage system's point of view before the snapshot is performed).

Prior to creating (i.e., snapping) snapshots of multiple volumes that store related data (i.e., across the multiple volumes), a consistency group is defined that specifies the volumes that are to be snapped at the same point in time in order to maintain data and application consistency. In embodiments of the present invention, the snapshot content metadata may include consistency group information such as pointers to the other concurrent snapshots of the related storage volumes. Advantages of storing consistency group information to the snapshot content metadata include:

Retaining the configuration of the consistency group if the consistency group is transient and short-lived.

Ensuring that all the volumes in the consistency group are available when restoring the snapshots of the consistency group.

Ensuring that the correct version of each snapshot (i.e., snapshots that were "snapped" at the same point in time) is available when restoring the snapshots of the consistency group.

If at a later time, a snapshot of one of the given volumes of the consistency group is restored, the snapshot content metadata can be accessed to identify snapshots of any related volumes that need to be restored in order to preserve the integrity of data stored on the related storage volumes.

Storage systems are typically dynamic in the sense that their hardware and software configurations can change over time. By creating and storing snapshot content metadata, embodiments of the present invention can help the storage system identify any changes such as:

A storage volume may be renamed.

A snapshot may be converted to a regular volume, thereby losing its relationship with the (parent) volume the snapshot was "snapped" from.

A space management algorithm on the storage system may replace older snapshots with newer snapshots.

Volumes and their respective snapshots may be migrated to different storage systems, and snapshots that are part of a given consistency group may be separated from the other snapshots in the given consistency group.

A file system used by a given host computer was updated subsequent to creating a given snapshot.

An operating system on a given host computer was updated (e.g., a service pack or a hot fix was applied).

An application that created the files in the snapshot was upgraded and now stores data in a different file format.

When mirroring or replicating a source volume to a destination volume, a snapshot operation typically creates two identical snapshots for the source and the destination volumes. Adding snapshot content metadata to the destination volume snapshot can maintain the link to the source volume (which may also be replicated and thus have multiple snapshots), and indicate valid options for a restore operation performed at the site of the destination volume.

System Description

FIG. 1 is a schematic pictorial illustration of a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a network attached storage (NAS) or a SAN system.

Storage subsystem 20 comprises a clustered storage controller 34 coupled between SAN 26 and a private network 46 using data connections 30 and 44, respectively, and incorporating adapters 32 and 42, again respectively. Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Routing records, indicating the association of logical addresses of logical volumes with partitions and the association of the partitions with the caches, are distributed by SAN 26 to one or more generally similar network interfaces 38 of storage modules 36. It will be understood that storage subsystem 20, and thus clustered storage controller 34, may comprise any convenient number of network interfaces 38. Subsequent to the formation of storage devices 50, network interfaces 38 may receive I/O commands from host computers 22 specifying logical addresses of storage devices 50. The network interfaces use the routing records to break the commands into I/O instructions, or command subsets, that are then distributed among caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be directly coupled to storage modules 36.

Data having contiguous logical addresses are generally distributed among storage devices 50. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
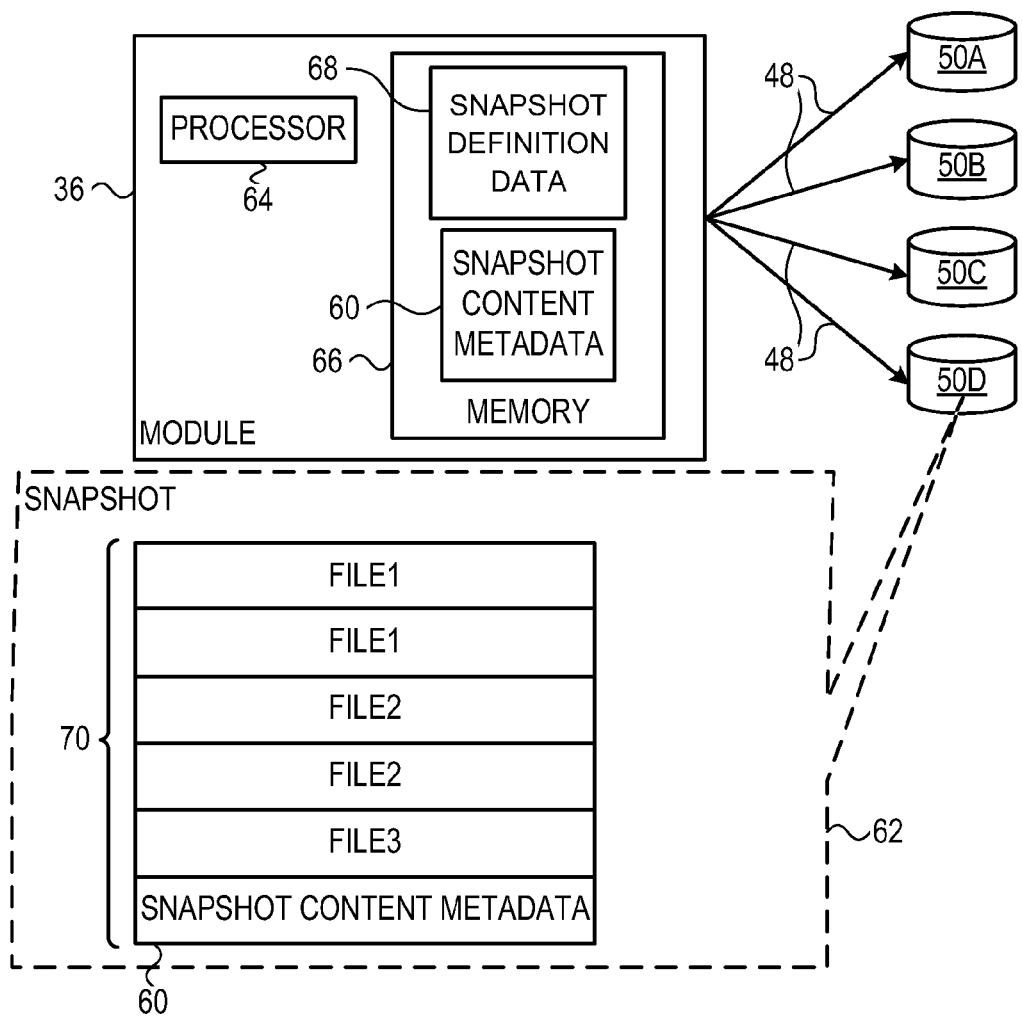
FIG. 2 is a schematic pictorial illustration of a module of the storage system configured to create and store snapshot content metadata, in accordance with an embodiment of the present invention.

FIG. 2 is a schematic pictorial illustration of module 36 configured to create snapshot content metadata 60 for a snapshot of a logical volume (not shown) stored on a given storage device 50, in accordance with an embodiment of the present invention. In the description herein, storage devices 50 may be differentiated by appending a letter to the identifying numeral, so that storage devices 50 comprise storage devices 50A, 50B, 50C and 50D. Storage devices 50 typically comprise a combination of high capacity hard disk drives and solid state disk drives.

Module 36 comprises a processor 64 and a volatile memory 66. Memory 66 is configured to store snapshot definition data and snapshot content metadata 60 that are associated with snapshot 62. In the example shown in FIG. 2, snapshot 62 comprises blocks 70 that are stored on storage device 50D. In some embodiments, storage devices 50 may be configured as a redundant array of inexpensive disks (RAID), and blocks 70 may be distributed among the multiple storage devices. Each block typically comprises a sequence of bytes having a specific length, typically one megabyte.

In the example shown in FIG. 2, three files are stored in blocks 70. File1 is stored in the first two blocks 70, File2 is stored in the third and fourth blocks 70, and File3 is stored in the fifth block 70. In an alternative example (not shown), a file allocation table (FAT) is stored in the first block 70, File1 is stored in the second and fifth block 70, File2 is stored in the third and fourth block 70, and File3 is stored in the sixth block 70.

As described in detail hereinbelow, processor 64 may store snapshot content metadata 60 to a given block 70 (i.e., the sixth block 70 in the example shown in FIG. 2). Snapshot definition data 68 is configured to store information such as pointers to blocks 70, and a date and a time that snapshot 62 was created. As described in detail hereinbelow, snapshot content metadata 60 comprises information on files (e.g., File1, File2 and File3) stored in the snapshot, and any relevant information on host computer 22, including but not limited to a catalog (i.e., listing the files), operating system version, application software version, and rights of a user (not shown) initiating the snapshot.

Processor 64 typically comprises a general-purpose computer, which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

While the example shown in FIGS. 1 and 2 describe storage host computers 22 implementing a file system and making files available, other configurations are to be considered within the spirit and scope of the present invention. For example, storage subsystem 20 may comprise a network attached storage system (NAS) which implements a file system and making files available to the host computers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Defining Snapshot Content Metadata

Figure 3:
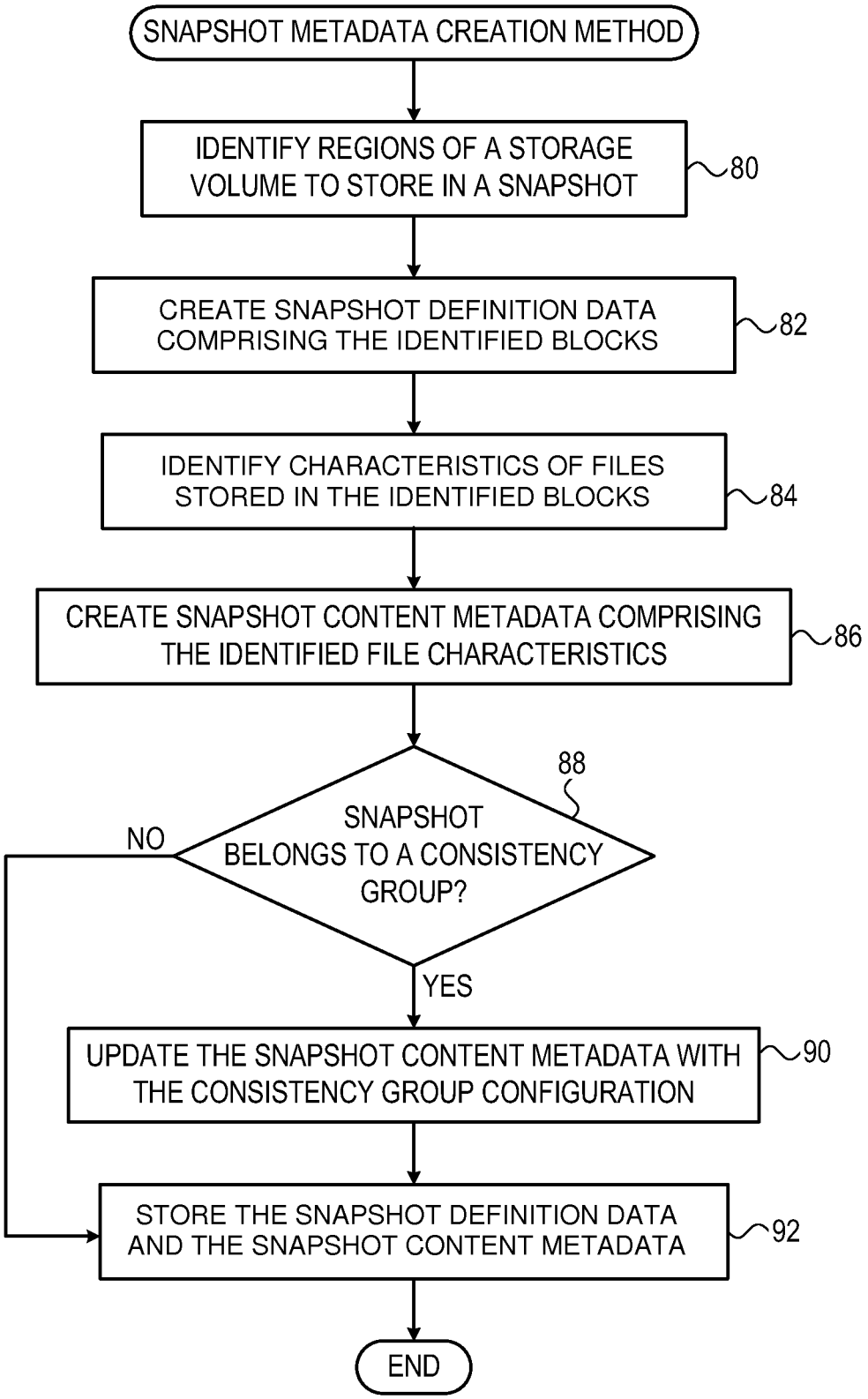
FIG. 3 is a flow diagram that schematically illustrates a method of creating snapshot metadata, in accordance with a first embodiment of the present invention.

FIG. 3 is a flow diagram that schematically illustrates a method of creating snapshot definition data 68 and snapshot content metadata 60 for snapshot 62, in accordance with an embodiment of the present invention. In a first identification step 80, processor 64 identifies blocks 70 of a storage volume to be stored in snapshot 62, and in a first creation step 82, the processor creates snapshot definition data 68. As described supra, snapshot definition data 68 comprises information such as pointers to blocks 70, a name for snapshot 62, and a date and time that the snapshot was created. Snapshot definition data 68 may also comprise information specific to one or more files stored in the snapshot 62, such as pointers to blocks, names of files, and dates and times that file were created in the snapshot 62. Snapshot definition data 68, thereby may comprise characteristics of the snapshot 62 and characteristics of one or more files stored therein.

In a second identification step 84, a given host computer 22 identifies configuration information of the storage volume stored in snapshot 62. For example, the given host computer may be executing a backup application that defines snapshot content metadata 60. In the example, shown in FIG. 2, snapshot 62 includes files File1, File2 and File3. Processor 64 can also identify configuration information of module 36 and storage devices 50 when creating snapshot 62. The configuration information includes, but are not limited to:

File names of files in the snapshot (also known as a file catalog).

Name and version of an operating system (including a version number) executing on the given host computer at the time the snapshot was created.

Name and version of a file system that was implemented by the given host computer on storage device 50 when the snapshot was created. Examples include Microsoft Corporation's New Technology File System (NTFS™), and the Unix File System (UFS).

Name and address of clustered storage controller 20.

Name and version of an application that created the files (e.g., database server software).

Name and version of a backup application that created the snapshot.

Configuration data used by the backup application. For example, Microsoft Corporation's Volume Snapshot Service™ (VSS) creates an Extensible Markup Language (XML) file that includes information for a given backup.

In a second creation step 86, the given host computer 22 creates snapshot content metadata 60 based on the identified snapshot characteristics and the identified snapshot configuration, and associates the snapshot content metadata with snapshot 62. In a comparison step 88, if snapshot 62 belongs to a consistency group, then processor 64 updates snapshot content metadata 60 with a configuration of the consistency group (including any additional related storage volumes) in an update step 90. Alternatively, processor 64 may convey the configuration of the consistency group to the given host computer, and the given host computer can update snapshot content metadata 60.

For example, File2 may comprise a database whose schema file (not shown) is stored on a logical storage volume stored on storage device 50B. Storage devices 50B and 50D can be joined to create a consistency group, thereby ensuring that snapshots of storage devices 50B and 50D are created at the same point in time.

Therefore, when updating snapshot content metadata 60 with the consistency group information, the given host computer may store the consistency group information to the snapshot content metadata associated with both snapshots (i.e., snapshot 60 and the related snapshot. For example, snapshot content metadata may comprise an identity of the related snapshot on storage device 50B that includes the schema file. In instances where a given consistency group spans multiple storage subsystems 20, snapshot content metadata may include the name and address of each of the storage subsystems.

In a storage step 92, processor 64 stores snapshot definition data 68 and snapshot content metadata 60 to clustered storage controller 20, and the method ends. Returning to step 88, if snapshot 62 does not belong to a consistency group, then the method continues with step 92.

In storage step 92, processor 64 may store snapshot content metadata 60 to memory 66. If, at a time subsequent to creating snapshot 62, processor 64 receives a command from a given host computer 22 to restore the snapshot, the processor can retrieve the snapshot definition data and the snapshot configuration metadata from memory 66, and convey the snapshot content metadata to the given host computer. Prior to restoring the snapshot, the given host computer can retrieve snapshot content metadata 60, and use the snapshot content metadata to ensure that that the given host computer (and its environment) is properly configured to correctly read and process data in the restored volumes. For example, the given host computer can ensure availability of compatible file system drivers and applications for the restored volume.

As described supra, snapshot 62 comprises a copy of data residing on a logical storage volume that is created at a particular point in time. There may be instances where processor 64 is not configured to associate the snapshot content metadata with the snapshot definition data. In alternative embodiments described hereinbelow, processor 64 can associate snapshot content metadata 60 with snapshot 62 by storing the snapshot content metadata to a given block 70 of the snapshot.

In the alternative embodiments, a given host computer 22 may add an additional block 70 of storage device 50 to snapshot 62, where the additional block is configured to store snapshot content metadata 60. Since snapshot 62 includes the additional block, snapshot definition data 68 may include a pointer to the additional block (i.e., in addition to blocks 70 for File1, File2 and File3).

In a first alternative embodiment, when defining the logical volume, a given host computer 22 may configure the logical volume as two partitions (i.e., logical storage units), wherein a first partition comprises the blocks storing the files (e.g., File1, File2, and File3), and a second "hidden" partition comprises the additional block storing snapshot content metadata 60. When the given host computer creates snapshot 62 for the logical volume, the snapshot comprises data (i.e., blocks) from both the first and the second partitions).

Typically, when creating snapshot 62, the given host computer can convey a request to processor 64 to store snapshot content metadata 60 to the second partition. To restore snapshot 62, the given host computer can convey a command to processor 64 to restore the snapshot, and processor 64 responsively retrieves snapshot definition data 68 from memory 66, and restores the snapshot. The given host computer can then retrieve snapshot content metadata 62 from the second partition in the retrieved snapshot.

In a second alternative embodiment, the given host computer creates an additional file in the logical storage volume stored on storage devices 50, and stores snapshot content metadata to the additional file; processor 64 includes the additional file in snapshot 62. To flag the additional file as containing snapshot content metadata 62, the given host computer first creates the additional file and stores a specific data pattern (e.g., 00AABBCCDDEEFF01AABBCCDDEEFF02) to the additional file. The given host computer then creates the snapshot (i.e., on the volume storing the additional file), mounts the snapshot as writeable using raw access, and searches the blocks of the snapshot for the specific data pattern. Upon locating the specific data (i.e., in the sixth block 70 in the example shown in FIG. 2, the given host computer mounts the snapshot as writeable raw data, and stores snapshot content metadata 60 in proximity to the located specific data.

To restore snapshot 62, the given host computer can convey a command to processor 64 to restore the snapshot, and processor 64 responsively retrieves snapshot definition data 68 from memory 66, and restores the snapshot. The given host computer can then identify the additional file via the specific format (e.g., identify key words stored in the given block) and retrieve snapshot content metadata 60 from the additional file.

In a third alternative embodiment, when creating snapshot 62, the given host computer creates an additional logical volume, includes the additional volume in a consistency group, and stores snapshot content metadata 60 (including consistency group information) to the additional logical volume. To restore snapshot 62, the given host computer can convey a command to restore the snapshot, and processor 64 can responsively retrieve snapshot definition data 68 from memory 66, and restore the snapshot. The given host computer can then retrieve snapshot content metadata 60 from the additional volume.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A storage system, comprising:
   a storage device; and
   a host computer coupled to the storage device and configured to:
   identify at least one of configuration information of a storage volume stored on the storage device and characteristics of the snapshot, including characteristics of one or more files stored in the snapshot,
   wherein the configuration information includes a file system of the storage volume when the snapshot was created, an operating system executing on the storage system, a software application that created one or more files, a hardware configuration of the storage system, and consistency group information for the storage volume and any related additional storage volumes,
   create snapshot content metadata comprising the at least one of the identified characteristics and the configuration information, associate the snapshot content metadata with the snapshot, and store the snapshot content metadata.

2. The storage system according to claim 1, further comprising a processor configured to store the snapshot content metadata to a volatile memory of the storage system.

3. The storage system according to claim 2, wherein the host computer is configured to store the snapshot content metadata by storing the one or more files to a first partition in the storage volume and storing the storage content metadata to a second partition in the storage volume.

4. The storage system according to claim 2, wherein the host computer is configured to store the snapshot content metadata by creating an additional file on the storage volume, storing a specific data pattern to the additional file, creating the snapshot, mounting the snapshot as writeable with raw data access, locating the specific data pattern in the snapshot, and storing the snapshot content metadata in proximity to the located specific data pattern.

5. The storage system according to claim 1, further comprising a processor configured to store the snapshot content metadata to a storage device of the storage system.

6. The storage system according to claim 1, wherein the host computer is configured to select the configuration information from a file system used to store the one or more files, an operating system executing on the storage system, a software application that created one or more files, a hardware configuration of the storage system, and consistency group information for the storage volume and any related additional storage volumes.

7. The storage system according to claim 1, wherein the identified characteristics include a pointer to at least one block, a name of the one or more files, a date and time the one or more files was created, a name for the snapshot, and a date and time that the snapshot was created.

8. A computer program product, the computer program product comprising:

a non-transitory computer readable storage medium having executable computer readable program code portions embodied therewith, the executable computer readable program code portions comprising:

computer readable program code configured to identify at least one of configuration information of a storage volume stored on a storage system and characteristics of the snapshot, including characteristics of one or more files stored in the snapshot;

wherein the configuration information includes a file system of the storage volume when the snapshot was created, an operating system executing on the storage system, a software application that created one or more files, a hardware configuration of the storage system, and consistency group information for the storage volume and any related additional storage volumes;

computer readable program code configured to create snapshot content metadata comprising at least one of the identified characteristics and the configuration information; and computer readable program code configured to associate the snapshot content metadata with the snapshot.

9. The computer program product according to claim 8, further comprising computer readable program code configured to store the snapshot content metadata to a volatile memory of the storage system.

10. The computer program product according to claim 8, further comprising computer readable program code configured to store the snapshot content metadata to a storage device of the storage system.

11. The computer program product according to claim 8, wherein the computer readable program code is configured to store the snapshot content metadata by storing the one or more files to a first partition in the storage volume and storing the storage content metadata to a second partition in the storage volume.

12. The computer program product according to claim 8, wherein the computer readable program code is configured to store the snapshot content metadata by creating an additional file on the storage volume, storing a specific data pattern to the additional file, creating the snapshot, mounting the snapshot as writeable with raw data access, locating the specific data pattern in the snapshot, and storing the snapshot content metadata in proximity to the located specific data pattern.

13. The computer program product according to claim 8, wherein the computer readable program code is configured to select the configuration information from a file system used to store the one or more files, an operating system executing on the storage system, a software application that created the one or more files, a hardware configuration of the storage system, and consistency group information for the storage volume and any related additional storage volumes.

14. The computer program product according to claim 8, wherein the computer readable program code is configured to select the identified characteristics from a pointer to at least one block, a name of the one or more files, a date and time the one or more files was created, a name for the snapshot, and a date and time that the snapshot was created.

* * * * *